March 28, 1950 W. FADER 2,501,935
PORTABLE COOKING OR HEATING OVEN
Filed May 10, 1947 3 Sheets-Sheet 1
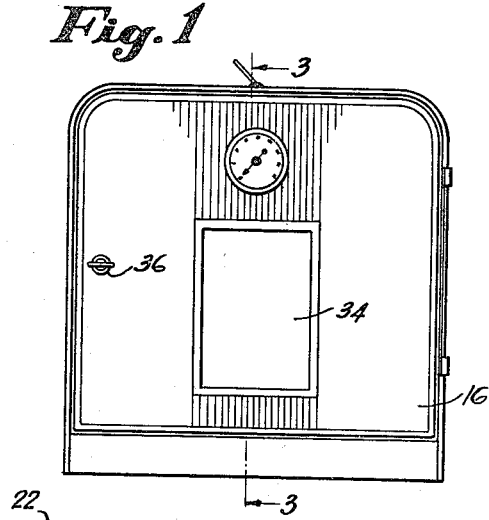
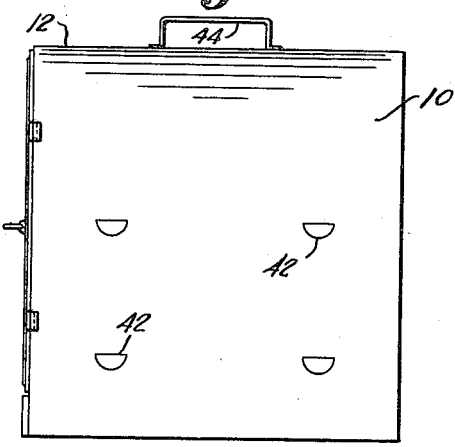
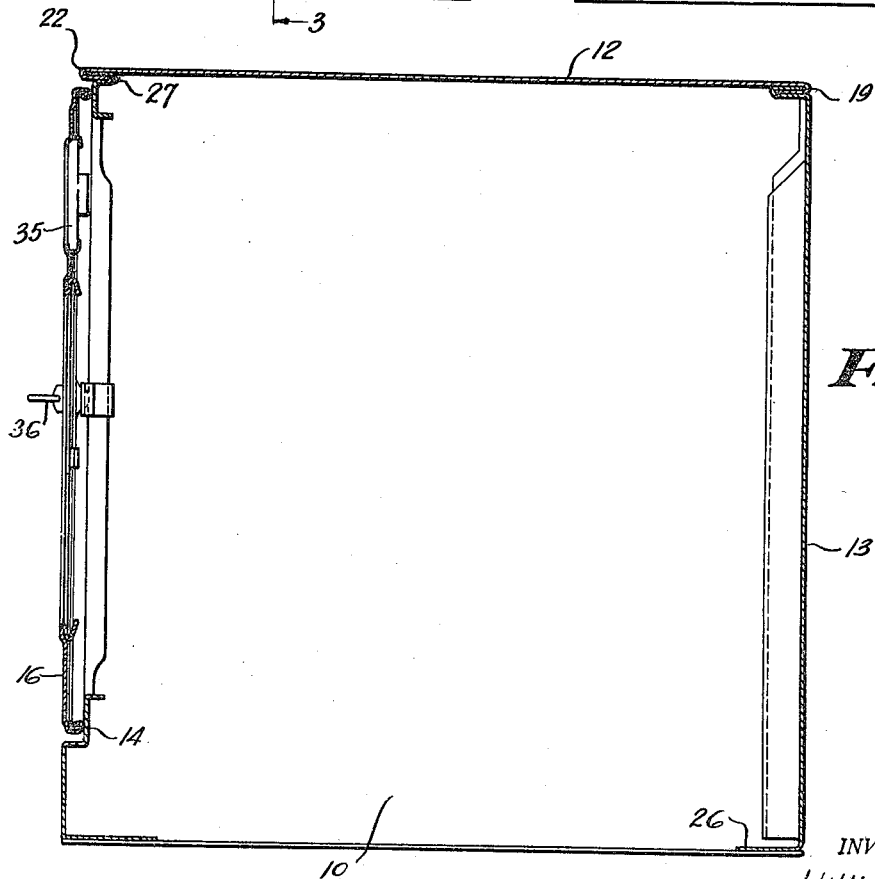
INVENTOR.
William Fader
BY Richards Geier
ATTORNEYS March 28, 1950  W. FADER  2,501,935
PORTABLE COOKING OR HEATING OVEN
Filed May 10, 1947  3 Sheets-Sheet 2
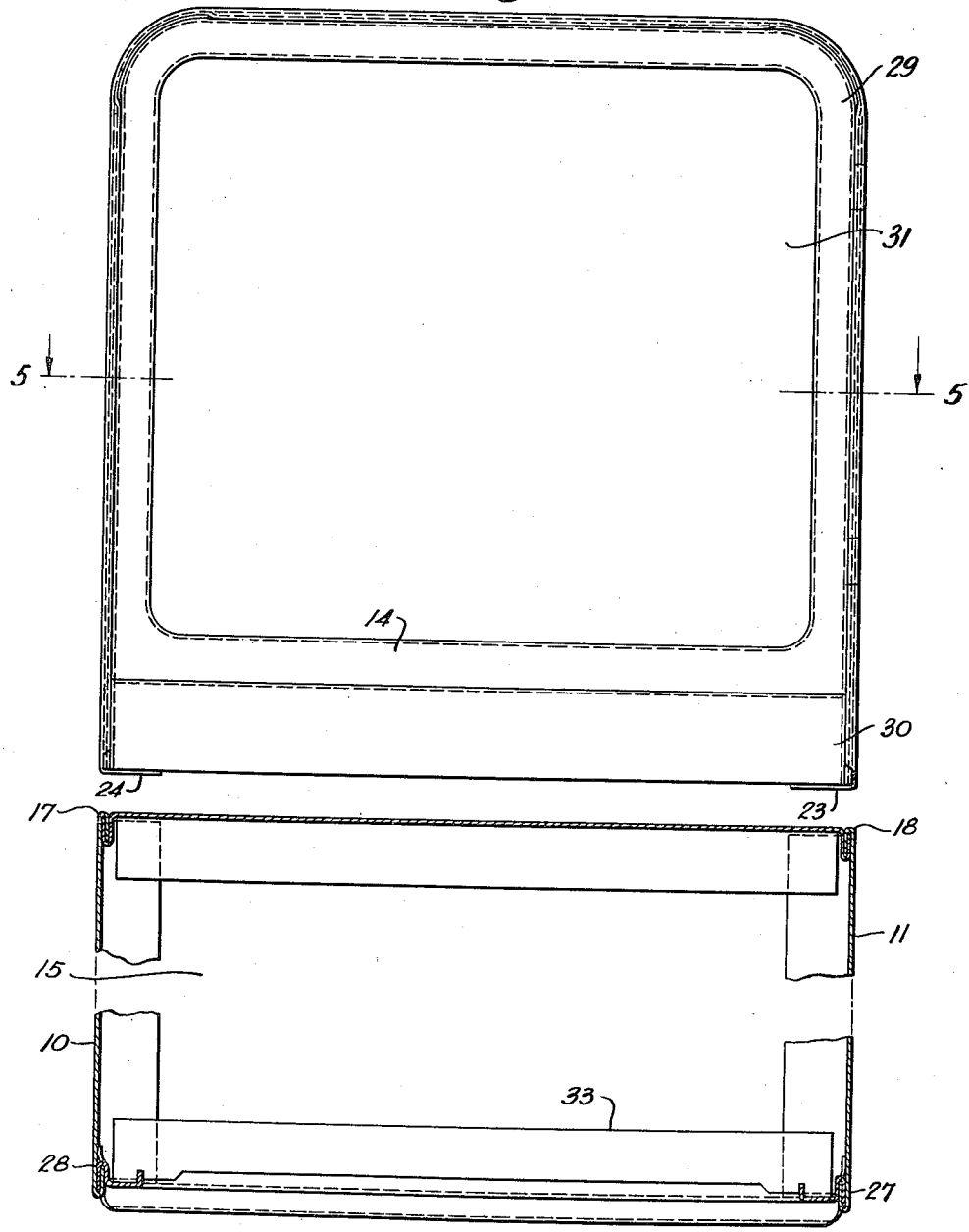

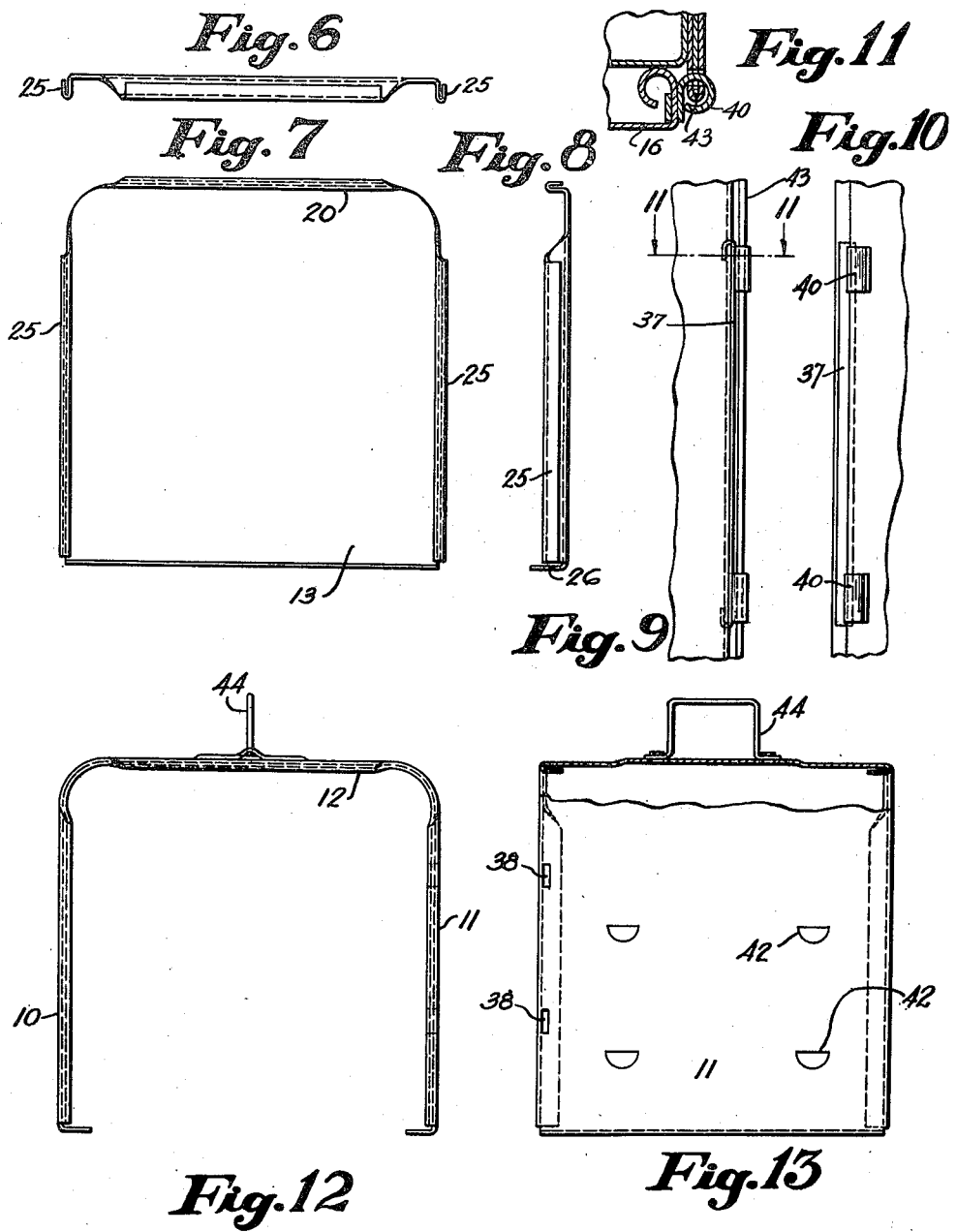

Patented Mar. 28, 1950

2,501,935

UNITED STATES PATENT OFFICE 2,501,935

PORTABLE COOKING OR HEATING OVEN

William Fader, Newark, N. J.

Application May 10, 1947, Serial No. 747,286

3 Claims. (Cl. 126—275)

This invention relates to ovens for heating or cooking, and more particularly to portable ovens adapted for use over gas and oil burners and the like.

It is an object of the present invention to provide an oven suitable for mass production.

A further object is to provide an oven in which material waste is relatively slight.

Other objects of the present invention will become apparent in the course of the following specification.

In the attainment of these objectives the oven has been formed of four major members, one of which is bent to form the top and two sides, one the back, one the front, the other the door, assembled with open bottom for installation over any suitable heating unit. The member bent to form the top and sides has turned in edges along the top and sides at both the front and back as part of a subsequently described locking means with the back and front members. A turned in rim at the base of and at right angles to the sides serves as a base for the oven as well as reinforcements for the back and front members when secured to corresponding portions thereof. The edges of the back member are turned in at right angles with those along the top and sides then turned back to form receptacles or sleeves for the previously mentioned turned in edges of the sides and top. The front of the oven, provided with an opening and door, is attached to the top and side surface portions in a somewhat similar manner.

The invention will appear more clearly from the following detailed description when taken in connection with the accompanying drawings showing by way of example a preferred embodiment of this invention.

In the drawings:

Figure 1 is a front elevational view of the oven constructed in accordance with the principles of this invention.

Figure 2 is a right side view of the oven shown in Figure 1.

Figure 3 is a sectional view taken along the line 3—3 of Figure 1, enlarged.

Figure 4 is a front elevational view of the oven with door removed, also enlarged.

Figure 5 is a sectional view taken along the line 5—5 of Figure 4.

Figure 6 is a top view of the back member of the oven shown in Figure 1.

Figure 7 is a front view of the back member shown in Figure 6.

Figure 8 is an end view of the back member shown in Figure 7.

Figure 9 is an enlarged detail view of a hinge shown in fragmentary form in relation to door.

Figure 10 is a side view of Figure 9.

Figure 11 is an enlarged sectional plan view taken along the line 11—11 of Figure 9.

Figure 12 is a front elevational view of the top and sides of the oven shown in Figure 1.

Figure 13 is a right side view of Figure 12 with top portion shown in section.

Referring now in greater detail to the drawings in which Figure 1 shows the front of the oven in elevation with closed door, 10 (Fig. 2) indicates the right side of the oven, 11 (Fig. 1) the left side, 12 (Fig. 2) the top, 13 (Fig. 7) the back, 14 (Fig. 4) the front, 15 (Fig. 5) the open base, and 16 (Fig. 1) the door.

The sides 10 and 11 and the top 12 are formed of one piece of material of any type having rigidity, and capable of being bent and withstanding relatively high temperatures. Obviously, the top and sides might be constructed of more than one piece if desired.

The back edges 17 and 18 (Fig. 5) of the sides 10 and 11, respectively, as well as the back edge 19 (Fig. 3) and front edge 22 (Fig. 3) of the top 12 are turned inward as shown in Figures 3 and 5 with aperture between the edges so turned and the surface portions of the respective members adapted to fit in the subsequently described sleeves of the back 13 and front 14 surface portions. Along the curved surface portions between the sides and top the turned in edges are folded back in substantial contact with the surface portions of the respective members although other types of construction could be used. The bases 23 and 24 (Fig. 4) of the sides 11 and 10, respectively, are turned inwardly at right angles to the plane of the surface portions. Supports 42 are formed in alignment in the sides by partially severing the surface portions therearound and bending the portions so severed inwardly as a means for supporting the racks or grilles (not shown) usually found in ovens of this type. The handle 44 (Fig. 2) is inserted in the top surface portion as a convenience in transporting.

The top edge 20 (Fig. 7) of the back 13, the perpendicular edges 25, as well as the bottom edge 26, are turned inwardly at right angles to the main surface portion except around the curves at the top. The edges 20 and 25 so formed are then turned back to form sleeves adapted to receive the previously described edges 17, 18, and 19 of the sides and top. At the base the previously described perpendicular members of the back and sides may be secured where overlapped. Apertures (not shown) formed in the sleeves adapted to co-act with partially cut through segments of the folded back edges which are inserted therethrough and folded thereover may be provided for additional security.

The front surface portion 14 is formed for attachment to the sides and top in a manner somewhat similar to that for attaching the back. The upper part 29 (Fig. 4) of the front surface portion is recessed in back of the lower part 30 to form a receptacle for the door 16 (Fig. 1) hingedly mounted to cover the aperture 31 (Fig. 4). The top edge 27 (Fig. 3) and perpendicular edges 28 (Fig. 5) along the upper part 29 of the front surface portion are formed into sleeves in the same manner as the sleeves of the back surface portion already shown. The edges of the lower part 30 (Fig. 4) are turned inwardly at right angles without being formed into sleeves. The edge 33 (Fig. 5) at the base of the lower part 30 is also turned inwardly at right angles to the plane thereof and may be fastened to corresponding edges of the sides as at the back and previously described.

The door 16 is hingedly attached to the rim 43 (Fig. 9) formed by folding back the edge 28 of the side 11 in the manner previously described, for covering the aperture 31 (Fig. 4). At the top of the door 16 is an aperture for insertion of a thermometer 35 and below the aperture 34 in which a heat resistant transparent member is inserted. The door latch 36 is adapted to secure the door 16 along the edge of the aperture 31. The hinging means shown in Figure 10 consists of the bar 37 near the ends of which the rotary members 40 are attached for rotatable insertion through the apertures 38 (Fig. 13) in the above mentioned rim 43. Beyond the rotary members 40 the ends of the bar 37 are secured to the door rim as shown in Figure 9.

It is apparent that the specific illustration shown has been given by way of illustration and not by way of limitation and that the structure above described is subject to a wide variation and modification without departing from the scope or intent of the invention, all of which variations and modifications are to be included within the scope of the present invention.

What is claimed is:

1. In a portable cooking and heating oven, which is open at the bottom thereof, in combination, a continuous member having a substantially flat top portion, substantially flat side portions and rounded portions between said top and side portions, said top and side portions forming the top and two sides of the oven, said member having front and back edges which are turned inwardly upon itself, the turned front and back edges of said top and side portions being spaced therefrom to form sleeves, the inner edge of said turned portions of the back edges facing toward the front edge of the continuous member and the inner edge of the turned portions of the front edges facing toward the back edge of the continuous member, the turned front and back edges of said rounded portions being folded back in contact with the surface of said rounded portions, said member further having bottom edges extending inwardly at right angles to said side portions, a front member and a back member, said front and back members having top and side inturned flanged edges which edges are turned outwardly and backwardly upon themselves, said turned portions extending behind said other sleeves to form sleeves in locking engagement therewith, and the outlines of said front and back members corresponding to those of the front and back of said continuous members.

2. In a portable cooking and heating oven which is open at the bottom thereof, in combination, a continuous member having a substantially flat top portion, substantially flat side portions and rounded portions between said top and side portions, said top and side portions forming the top and two sides of the oven, said member having front and back edges which are turned inwardly upon itself, the turned front and back edges of said top and side portions being spaced therefrom to form sleeves, the inner edge of said turned portions of the back edges facing toward the front edge of the continuous member and the inner edge of the turned portions of the front edges facing toward the back edge of the continuous member, the turned front and back edges of said rounded portions being folded back in contact with the surface of said rounded portions, said member further having bottom edges extending inwardly at right angles to said side portions, a front member and a back member, said front and back members having top and side inturned flanged edges which edges are turned outwardly and backwardly upon themselves, said turned portions extending behind said other sleeves to form sleeves in locking engagement therewith, said front and back members further having bottom edges extending inwardly at right angles thereto and in contact with the bottom edges of said continuous member, and the outlines of said front and back members corresponding to those of the front and back of said continuous members.

3. In a portable cooking and heating oven which is open at the bottom thereof, in combination, a continuous member forming the top and two sides of the oven, said member having front and back edges which are turned inwardly upon itself and form sleeves, the inner edge of said turned portions of the back edges facing toward the front edge of the continuous member and the inner edge of the turned portions of the front edges facing toward the back edge of the continuous member, a separate front member having an outline corresponding to that of the front of said continuous member, said front member having top and side inturned flanged edges which edges are turned upon themselves, said turned portions extending behind the sleeves of said front edges to form sleeves in locking engagement therewith, said front member having an aperture formed therein and enclosed by edges extending inwardly at right angles to said front member, the portion of said front member adjacent said aperture being recessed in relation to a lower portion of said front member, a hinged door in said recessed portion, and a back member having top and side inturned flanged edges which edges are turned outwardly and backwardly upon themselves said turned portions extending behind the sleeves of said rear edges to form sleeves in locking engagement therewith.

WILLIAM FADER.

REFERENCES CITED

The following references are of record in the file of this patent:

UNITED STATES PATENTS

| Number | Name | Date |
|---|---|---|
| 201,660 | Flint | Mar. 26, 1878 |
| 208,343 | Somers | Sept. 24, 1878 |
| 938,916 | Treischmann | Nov. 2, 1909 |
| 993,483 | Wege | May 30, 1911 |
| 1,014,149 | Helman | Jan. 9, 1912 |
| 1,051,503 | Klein | Jan. 28, 1913 |
| 1,562,021 | Ziola | Nov. 17, 1925 |
| 1,721,191 | Smith | July 16, 1929 |
| 1,729,475 | Brainerd et al. | Jan. 9, 1929 |
| 1,977,486 | Louis | Oct. 16, 1934 |
| 2,170,409 | Hoffman et al. | Aug. 22, 1939 |
| 2,300,405 | Cook | Nov. 3, 1942 |

FOREIGN PATENTS

| Number | Country | Date |
|---|---|---|
| 191,978 | Great Britain | Jan. 25, 1923 |
| 320,252 | Germany | Apr. 16, 1920 |